(12) United States Patent
Szynkaruk et al.

(10) Patent No.: US 11,486,457 B2
(45) Date of Patent: Nov. 1, 2022

(54) INDICATOR FOR TORQUE LIMITER

(71) Applicant: Hamilton Sundstrand Corporation, Charlotte, NC (US)

(72) Inventors: Radoslaw Szynkaruk, Wroclaw (PL); Dominik Gunia, Szczytna (PL); Dariusz Kiełbowicz, Boleslawiec (PL); Jonathan Darby, Westlands (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1161 days.

(21) Appl. No.: 16/022,786

(22) Filed: Jun. 29, 2018

(65) Prior Publication Data
US 2019/0003543 A1 Jan. 3, 2019

(30) Foreign Application Priority Data
Jun. 29, 2017 (EP) .................................... 17461563

(51) Int. Cl.
| | |
|---|---|
| F16D 59/00 | (2006.01) |
| F16D 67/02 | (2006.01) |
| F16D 43/20 | (2006.01) |
| G08B 5/02 | (2006.01) |
| F16D 7/08 | (2006.01) |
| F16D 121/14 | (2012.01) |
| F16D 127/00 | (2012.01) |
| F16D 66/00 | (2006.01) |

(52) U.S. Cl.
CPC ............... *F16D 67/02* (2013.01); *F16D 7/08* (2013.01); *F16D 43/20* (2013.01); *F16D 59/00* (2013.01); *G08B 5/02* (2013.01); *F16D 2066/005* (2013.01); *F16D 2121/14* (2013.01); *F16D 2127/005* (2013.01); *F16D 2300/00* (2013.01)

(58) Field of Classification Search
CPC . F16D 7/08; F16D 67/02; F16D 43/20; F16D 59/00; F16D 2066/005; F16D 2121/14; F16D 2127/005; F16D 2300/00
See application file for complete search history.

(56) References Cited

U.S. PATENT DOCUMENTS

| | | | |
|---|---|---|---|
| 4,317,424 A * | 3/1982 | Steadman | F16D 43/216 116/56 |
| 4,625,843 A | 12/1986 | Maltby et al. | |
| 5,901,817 A | 5/1999 | Gitnes | |
| 7,114,601 B2 * | 10/2006 | Mayer | F16D 65/186 188/134 |
| 11,028,886 B2 * | 6/2021 | Kracke | F16D 67/00 |

(Continued)

FOREIGN PATENT DOCUMENTS

| | | |
|---|---|---|
| EP | 0168124 A1 | 1/1986 |
| EP | 1236920 A1 | 9/2002 |
| WO | 2008095163 A1 | 8/2008 |

OTHER PUBLICATIONS

Extended European Search Report for International Application No. 17461563.3 dated Jan. 8, 2018, 6 pages.

*Primary Examiner* — Thomas W Irvin
(74) *Attorney, Agent, or Firm* — Cantor Colburn LLP

(57) ABSTRACT

There is provided an indicator for a torque limiter, comprising one or more resilient members configured to move from an initial, compressed state during normal operation of the torque limiter, to a subsequent, expanded state upon tripping of the torque limiter, to provide a visual indication that the torque limiter has tripped.

9 Claims, 5 Drawing Sheets

(56) References Cited

U.S. PATENT DOCUMENTS

| | | | |
|---|---|---|---|
| 11,053,997 B2* | 7/2021 | Babicki | F16D 63/006 |
| 2002/0144876 A1 | 10/2002 | Harvey | |
| 2004/0200677 A1* | 10/2004 | Mayer | F16D 65/186 |
| | | | 188/134 |
| 2008/0185242 A1* | 8/2008 | Mayer | F16D 67/00 |
| | | | 188/181 T |
| 2018/0119763 A1* | 5/2018 | Babicki | F16D 41/067 |
| 2019/0063516 A1* | 2/2019 | Kracke | F16D 43/206 |

* cited by examiner

INDICATOR FOR TORQUE LIMITER

FOREIGN PRIORITY

This application claims priority to European Patent Application No. 17461563.3 filed Jun. 29, 2017, the entire contents of which is incorporated herein by reference.

FIELD

The present disclosure relates generally to an indicator for a torque limiter, and more specifically an indicator in the form of an elongated plug that replaces the previously used indicator arm in such applications.

BACKGROUND

Torque limiters are known in the art and comprise an input shaft and an output shaft, wherein torque is transferred from the input shaft to the output shaft in use. One or more coupling members may be provided to transmit torque from the input shaft to the output shaft. A number of systems are known in the art for preventing the overload of the coupling between the input shaft and the output shaft, which is the aim of the torque limiter. These typically work by employing a brake that is activated once a predetermined torque limit is exceeded. This method of limiting torque is typically used in aircraft applications, for example when actuating an aircraft flight control surface, in order to protect the actuator from damage.

It is known to provide a device that indicates when a torque limiting device has been activated, or tripped during flight. FIG. 1 shows an example of an indication device in the form of a rotating arm.

As can be seen in FIG. 1, a torque limiter 10 is shown that comprises an indicator sleeve 12 operatively connected to one or more coupling members of the torque limiter. As is known in the art, the coupling members are typically configured to brake the input shaft and/or the output shaft upon a torque from the input shaft exceeding a predetermined amount. Various methods of braking are known in the art. For example, in some arrangements a rotating component may be linked to the input or output shaft. Upon the input torque exceeding a predetermined amount, the rotating component may cause a cam surface to begin to rotate and contact a stationary outer ring, which locks the rotating component and, in turn, the input shaft. Other arrangements are also possible, and so the specific structure of the torque limiter 10 will not be described herein in detail.

In order to provide the indication that the torque limiter 10 has tripped, upon braking the coupling members initiate a mechanical movement that moves the indicator sleeve 12 in the direction of arrow 14. A small plunger 16 is located in a passageway 18 between the internal components of the torque limiter 10 (e.g., indicator sleeve 12) and an external cavity 20 provided on the outer surface 151 of the housing 11 of the torque limiter 10. Upon mechanical movement of the coupling members as aforesaid, the indicator sleeve 12 pushes the plunger 16 in the general direction of arrow 14.

An indicator arm 30 is provided within the cavity 20 and is rotatable about a pivot 22, such that upon movement of the indicator sleeve 12 and plunger 16 in the direction of arrow 14 the indicator arm 30 rotates in the direction of arrow 24, which lifts the indicator arm out of the cavity 20 in the direction of arrow 32.

Upon inspecting the torque limiter 10, an operator may easily see the indicator arm 30 is raised, and will know immediately that the torque limiter has tripped.

FIG. 2 shows the housing 11 of the torque limiter 10 in isolation and perspective view, from which it can be seen that the cavity 20 extends out from the periphery of the upper portion of the torque limiter 10, and requires complex machinery, such as apertures 23 for accommodating the pivot 22 (see FIG. 1).

It is desired to provide an improved method of indicating that a torque limiter has tripped, including an apparatus for doing so.

SUMMARY

In accordance with an aspect of the disclosure, there is provided an indicator for a torque limiter, comprising one or more members (e.g., resilient members) configured to move from an initial, compressed state (e.g., during normal operation of the torque limiter), to a subsequent, expanded state (e.g., upon tripping of the torque limiter), to provide a visual indication that the torque limiter has tripped.

The subsequent, expanded state may correspond to a rest state of the one or more resilient members, and/or the initial, compressed state may corresponds to a state in which an external force is applied in use to compress the one or more resilient members.

Upon release of the external force the one or more resilient members may be configured to move from the initial, compressed state to the subsequent, expanded state, for example to provide the visual indication that the torque limiter has tripped.

The one or more resilient members may comprise one or more resilient tines.

The one or more resilient members may be connected at a first end to an outer surface of the indicator, such that the one or more resilient members are compressible against or towards the outer surface of the indicator, and move from the compressed state to the expanded state in use by rotating about the connection at the first end.

The one or more resilient members (e.g., tines) may define an angle with respect to the outer surface of the indicator, wherein in the initial, compressed state the angle is relatively small, and in the subsequent, expanded state the angle is relatively large.

The angle may be between the outer surface of the indicator and a longitudinal axis and/or surface of the one or more resilient members (e.g., tines).

The surface of the one or more resilient members may correspond to a surface of the resilient member that is compressible towards the outer surface of the indicator.

The one or more resilient members may comprise a first set of resilient members located at a first position on the indicator, and a second set of resilient members located at a second, different position on the indicator. In use, the first set of resilient members at the first position may be configured to move from the initial, compressed state to the subsequent, expanded state prior to the second set of resilient members at the second, different position.

In accordance with an aspect of the disclosure, there is provided a torque limiter, the torque limiter comprising a cavity for retaining an indicator as described above. The cavity may extend from an outer surface of the torque limiter to an internal chamber of the torque limiter, and may be sized such that the one or more resilient members are compressed into their initial, compressed state when the indicator is located in the cavity in use.

The torque limiter may further comprise an indicator as described above and located within the cavity.

The torque limiter may further comprise a movable component configured to move in a given direction if the torque experienced by the torque limiter in use exceeds a given or predetermined amount. The movable component may be arranged to contact the indicator such that the movement of the movable component pushes the indicator at least partially through the cavity, and at least some of the resilient members completely through the cavity, such that the resilient members that are pushed completely through the cavity move from the initial, compressed state within the cavity to the subsequent, expanded state outside of the cavity and provide the visual indication that the torque limiter has tripped.

The indicator may be elongated and comprise a longitudinal axis. For example, the indicator may have a length (e.g., along its longitudinal axis) that is at least 2, 3, 4, 5 or even 10 times its largest width (e.g., laterally or transverse to its longitudinal axis). This can allow the indicator to sit inside a pocket or cavity (e.g., a cavity as described above) of relatively small dimensions, and reduce the exposure of the inside of the torque limiter to the external environment. For example, the width of the cavity may be less than 2 cm, 1 cm or even 0.5 mm.

A first set of the resilient members may be located at a first axial position along the length of the indicator, and a second set of the resilient members may be located at a second axial position along the length of the indicator. The first axial position may be closer to an end of the indicator that is located towards the outer surface of the torque limiter in use.

The movable component may be configured to push the indicator a limited amount such that, when the movable component pushes the indicator the first set of members are pushed out of the cavity and move from the initial, compressed state to the subsequent, expanded state (to provide the visual indication that the torque limiter has tripped), and the second set of members remain within the cavity and press against the surface of the cavity (to resist further movement of the indicator within the cavity). In this manner, the resilient members can provide a dual function, of firstly providing a visual indication that the torque limiter has tripped, and secondly resisting further movement of the indicator within the cavity.

The torque limiter may further comprise: a rotational input drive member; a rotational output drive member co-axial with said input drive member; one or more coupling members through which torque is transmitted from the input drive member to the output drive member; and a braking device attached to said input drive member or said output drive member and configured to restrict or prevent rotational movement of the torque limiter if the torque applied by said input drive member exceeds a given or predetermined amount; wherein said braking device comprises the movable component.

In accordance with an aspect of the disclosure, there is provided a method of installing an indicator in a torque limiter. The indicator may be an indicator in accordance with any of the aspects and embodiments described above and herein, and the torque limiter may be a torque limiter in accordance with any of the aspects and embodiments described above and herein. The method may comprise pushing the indicator into the cavity in the torque limiter such that the resilient members press against the surface of the cavity to hold the indicator in place within the cavity. The step of pushing the indicator into the cavity may be in response to the indicator being pushed out of the cavity due to the torque limiter tripping in use.

BRIEF DESCRIPTION OF THE DRAWINGS

Various embodiments will now be described, by way of example only, and with reference to the accompanying drawings in which.

DETAILED DESCRIPTION

The present disclosure is directed to a new type of indicator for use within a torque limiter that is aimed at reducing the complexity and manufacturing requirements that are currently necessary.

Figure 3A:
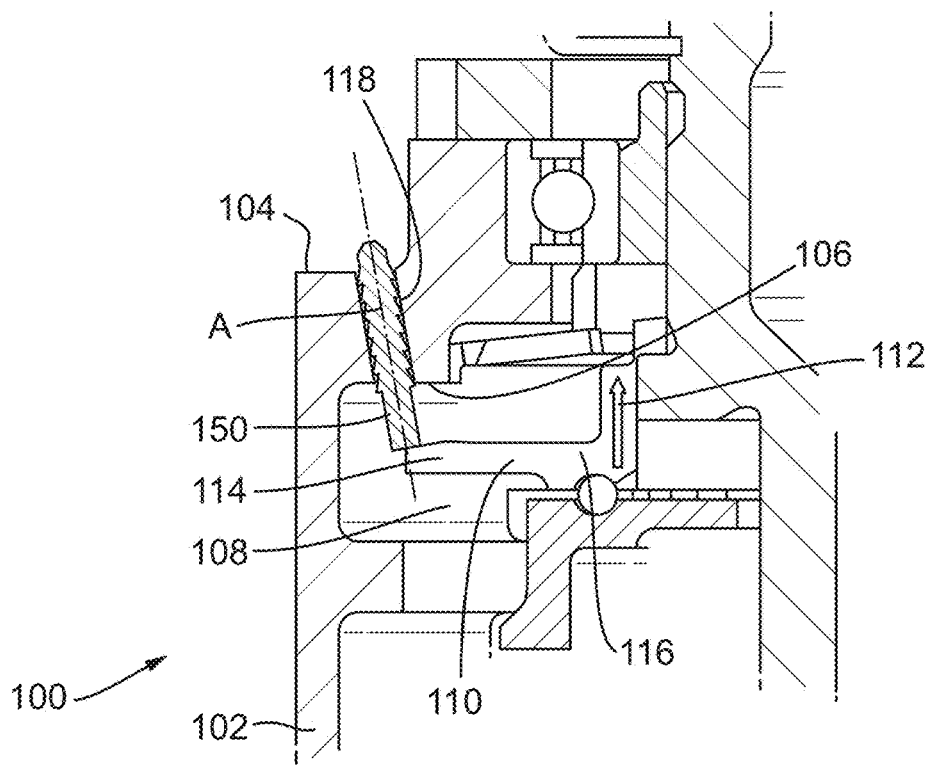
FIGS. 3A and 3B show an embodiment of a torque limiter and indicator in accordance with the disclosure.

FIG. 3A shows a torque limiter 100 in accordance with an embodiment of the present disclosure. The torque limiter 100 comprises a housing 102 within which sits a movable component 110 (e.g., an indicator sleeve as described above). The housing 102 comprises an outer surface 104. The movable component 110 is configured in use to move in the direction of arrow 112 upon an input torque to the torque limiter 100 exceeding a predefined amount. As discussed above, this movement of the movable component 110 may be achieved using various arrangements that are known in the art, such as using a cam surface linked to a rotating component of the torque limiter 100 as discussed above.

In accordance with the disclosure, an indicator 150 (e.g., having a longitudinal axis Y) is provided and sits within a cavity 118 of the torque limiter housing 102. The cavity 118 leads from an upper surface 106 of an internal chamber 108 of the torque limiter 100 to the outer surface 104 of the housing 102. A longitudinal axis A of the cavity 118 is shown in FIG. 3A.

Figure 3B:
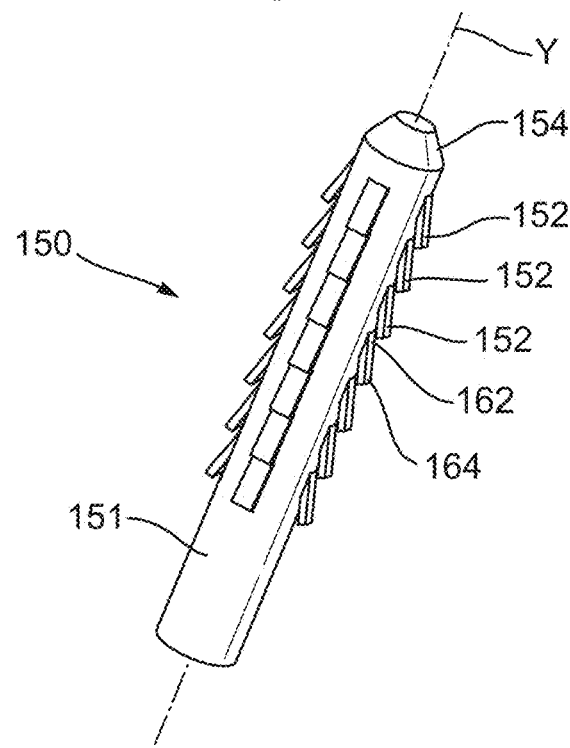

The indicator 150 is shown in more detail in FIG. 3B, and (in the illustrated embodiment) comprises an elongated tube, optionally made from polytetrafluoroethylene ("PTFE"), and having a plurality of resilient members 152 that are each attached at a first end 162 of the resilient member 152 to an outer surface 151 of the indicator 150. A second opposite end 164 of each resilient member 152 is free from attachment to the indicator 150, such that each resilient member 152 can move or pivot about its attachments to the indicator 150. In the illustrated example, the resilient members 152 are in the form of tines, although any suitable resilient member (e.g., flap, paddle, etc.) may be used.

The resilient members 152 may be biased to move outwardly away from the outer surface 151 of the indicator 150 when they are not located within the cavity 118. This may be achieved by pressing the resilient members onto the surface of the indicator 150 as it is inserted into the cavity 118, such that upon exiting the cavity 118 the resilient members 152 open out to form an increased angle between the outer surface 151 of the indicator 150 and the resilient member 152.

Referring back to FIG. 3A, the movable component 110 may comprise a central portion 116 that is operatively connected to one or more coupling members of the torque limiter 100. As described above in respect of the conventional arrangement, the coupling members may rotate with the input or output shaft of the torque limiter 100 and may be configured to move the movable component 110 (e.g., via a cam surface) upon input torque to the torque limiter 100 exceeding a predetermined amount. However, any suitable arrangement for moving the movable component 110 may be used in the technology of the present disclosure.

The movable component 110 may further comprise a flange portion 114 that extends out from the central portion 116 to a location beneath the cavity 118, and may be such that the flange portion 114 coincides with the longitudinal axis A of the cavity 118.

When the indicator 150 is inserted into the cavity 118, it may be pressed in until it contacts the flange portion 114. In this position, an upper or lid portion 154 of the indicator 150 may protrude from the outer surface 104 of the housing 102. The lid portion 154 may be bevelled around a circumference of the indicator 152 to provide a distinctive shape.

As shown in FIG. 3A, when the indicator 150 is within the cavity 118 the resilient members 152 may press against the surface of the cavity 118 and hold the indicator 150 in place. In this manner, the indicator 150 will not substantially move or fall out of the cavity 118 upon any orientation of the torque limiter 100. This can also help to effectively resist any movement, e.g., gravitational and other movements due to vibration or other external loads.

Other arrangements are possible to hold the indicator 150 in place. For example, the indicator 150 may comprise a portion configured to cooperate with a portion of the cavity 118 so as to provide an interference fit between the portion of the indicator 150 and the portion of the cavity 118. An interference fit may be provided between a portion of the indicator 150 (e.g., a circumferential flange or the outer surface 151 thereof) and the cavity 118.

During normal use, i.e., when the torque limiter 100 is operating below its torque limit (for example, the torque applied by the input shaft is below the predefined amount), the movable component 110 does not move in the direction of arrow 112, and the indicator 150 does not move within the cavity 118.

Figure 4A:
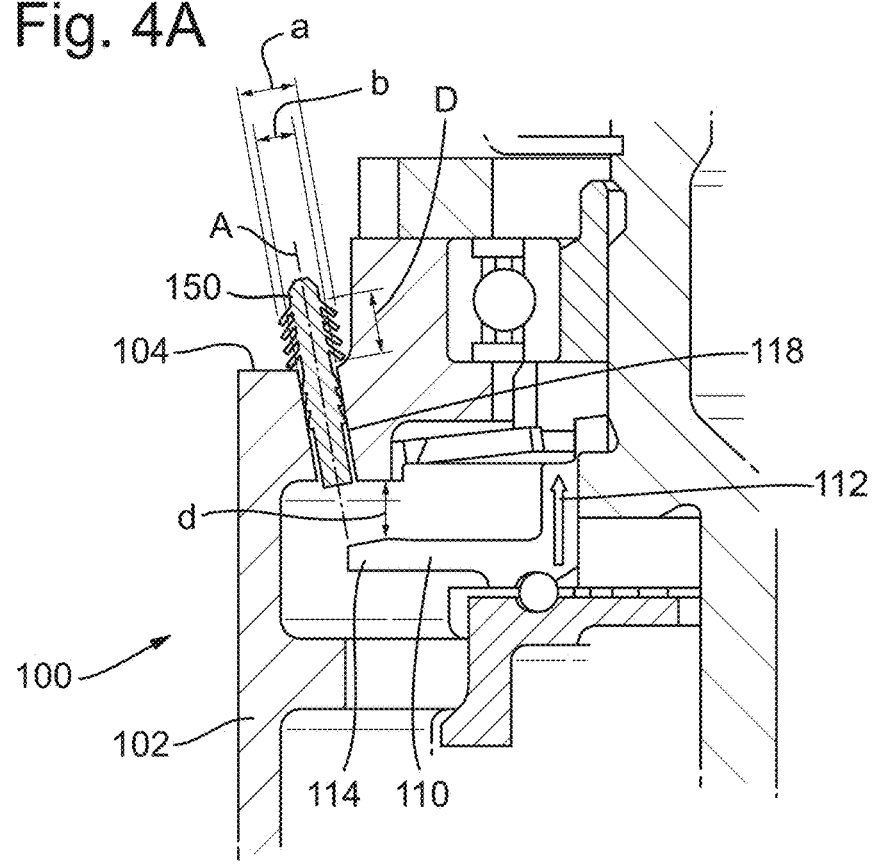
FIGS. 4A and 4B show the torque limiter and indicator of FIGS. 3A and 3B once the torque limiter has activated or tripped.
Figure 4B:
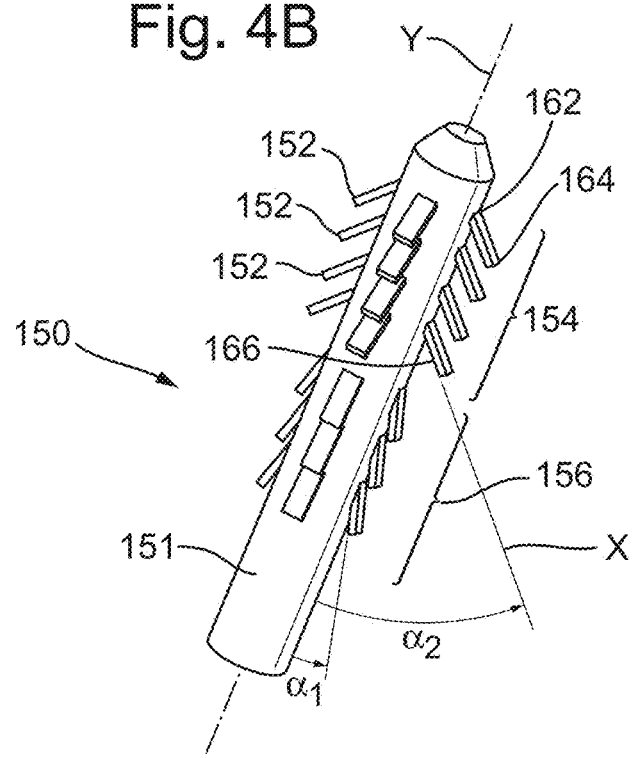

FIGS. 4A and 4B show the torque limiter 100 after its input torque limit has been exceeded, and the torque limiter 100 has tripped.

In this situation, the movable component 110 has moved in the direction of arrow 112, which has caused the indicator 150 to move along the longitudinal axis of the cavity 118 and protrude from the outer surface 104 of the housing 102 of the torque limiter 100.

Generally, and in any of the aspects or embodiments disclosed herein, the amount by which the indicator 150 protrudes from the housing 102 is governed by the amount of movement of the flange portion 114 of the movable component 110. As can be seen in FIG. 4A, the movable component 110 may be configured to move a distance d upon tripping of the torque limiter 100, which distance d, which substantially corresponds to a distance D that the indicator 150 has moved to protrude further from the outer surface 104 of the housing 102.

Referring to the embodiment of FIG. 4B, which shows the state of the indicator 150 when it is in the situation shown in FIG. 4A (i.e., partially protruding from the housing 102), a first set 154 of the resilient members 152 are no longer within the cavity 118 and have thus expanded out from the outer surface 151 of the indicator 150. A second set 156 of the resilient members 152 remain within the cavity 118 and press against the surface of the cavity 118 to continue to hold the indicator 150 in place.

Accordingly, in accordance with this embodiment, once the torque limiter 100 has tripped or activated, the indicator 150 slides upwards and protrudes further from the cavity 118, such that the first set 154 of the resilient members 152 no longer remain within the cavity 118 and expand, and the second set 156 of the resilient members 152 remain within the cavity 118 to continue to press against the surface of the cavity 118 and resist further axial movement of the indicator 150 along the longitudinal axis A of the cavity 118.

As discussed above, each resilient member 152 connects to the outer surface 151 of the indicator 150 at the first end 162, such that, upon activation or tripping of the torque limiter 100, the resilient member 152 rotates about the connection at the first end 162. Thus, the second, opposite end 164 expands outwardly from the outer surface 151 (i.e., the resilient member 152 rotates about the connection at the first end 162) to create an angle α between the outer surface 151 of the indicator 150 and the resilient member 152, e.g., the longitudinal axis X or lower surface 166 of the resilient member 152.

Generally, the angle α should be large enough to ensure that the resilient members 152 cannot move back into the cavity 118 once they have been released to their rest position (with no external force applied). To ensure this, the rest position of the resilient members 152 should be such that they extend laterally (e.g., perpendicular to the axis A) beyond the edge of the cavity 118 in the rest position. This can help to ensure that the indicator 150 cannot move back into the cavity 118 once it has protruded upon activation of the torque limiter 100, as described above.

Additionally, or alternatively, resilient members 152 may be provided on opposed sides of the indicator 150, and open out to a first distance a, which may be larger than the width b of the cavity 118.

In various embodiments, the angle α may remain acute upon activation of the torque limiter 100, for example the angle α may remain less than 80°, 70°, 60°, 45° or 30°. In other words, the rest angle α (with no external force applied) of the resilient member may be less than 80°, 70°, 60°, 45° or 30°. Additionally, or alternatively the resilient members 152 may be configured to open by an amount not exceeding 30°, 45°, 60°, 70° or 80°.

Figure 5A:
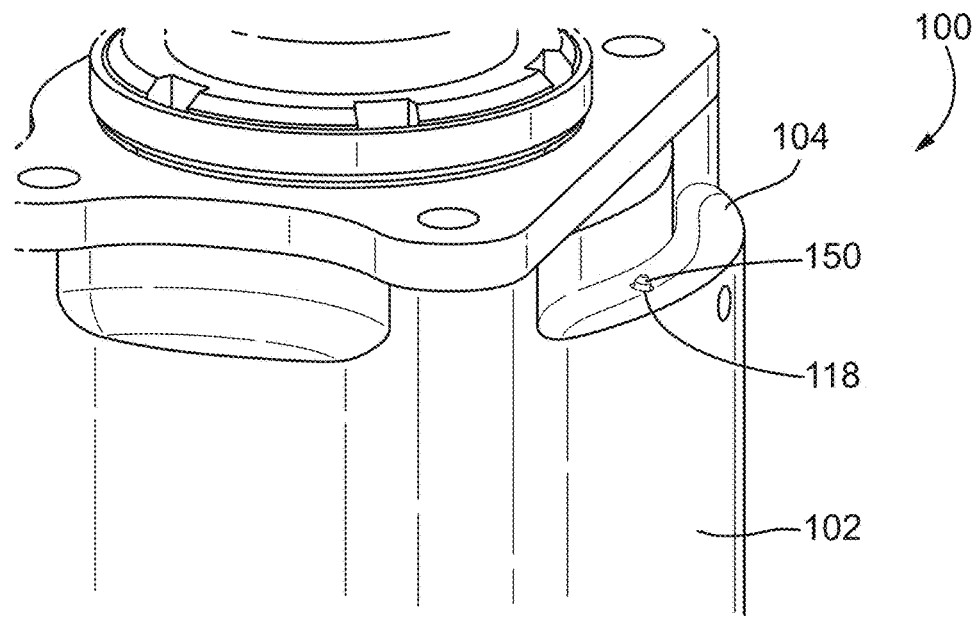
FIG. 5A shows the torque limiter of FIGS. 3A and 3B prior to activation.
Figure 5B:
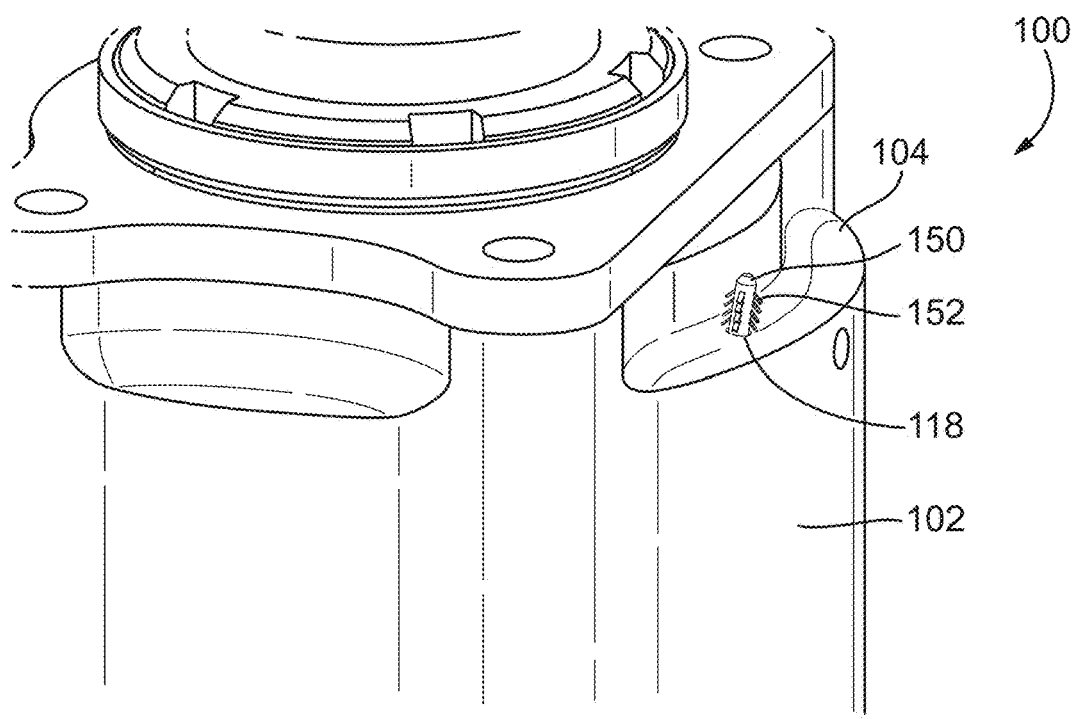
FIG. 5B shows the torque limiter of FIGS. 3A and 3B after activation.

FIGS. 5A and 5B show the external view of the torque limiter 100 before and after it has tripped. As can be seen from FIG. 5A, the indicator 150 is situated within the cavity 118 and none of the resilient members 152 can be seen in an expanded form. Upon activation of the torque limiter 100, the indicator 150 moves partially out of the cavity 118 and protrudes from the outer surface 104 of the housing 102, such that at least some of the resilient members 152 (e.g., the first set of resilient members 154) are no longer within the cavity 118 and can be seen in an expanded form. Although not essential, as described above some of the resilient members 152 (e.g., the second set 156) may remain within the cavity 118 to continue to resist further axial movement of the indicator 150.

The present disclosure, therefore, provides a distinctive, simple and reliable method of indicating that the torque limiter has tripped, by providing the indicator 150 comprising expandable resilient members 152. For example, a ground service engineer inspecting the torque limiter 100 (which may be one of many torque limiter is that they are required to inspect) can quickly determine whether the torque limiter has tripped by noting whether the indicator 150 has protruded further from the housing 102 and/or whether any of the resilient members 152 have expanded.

Figure 6A:
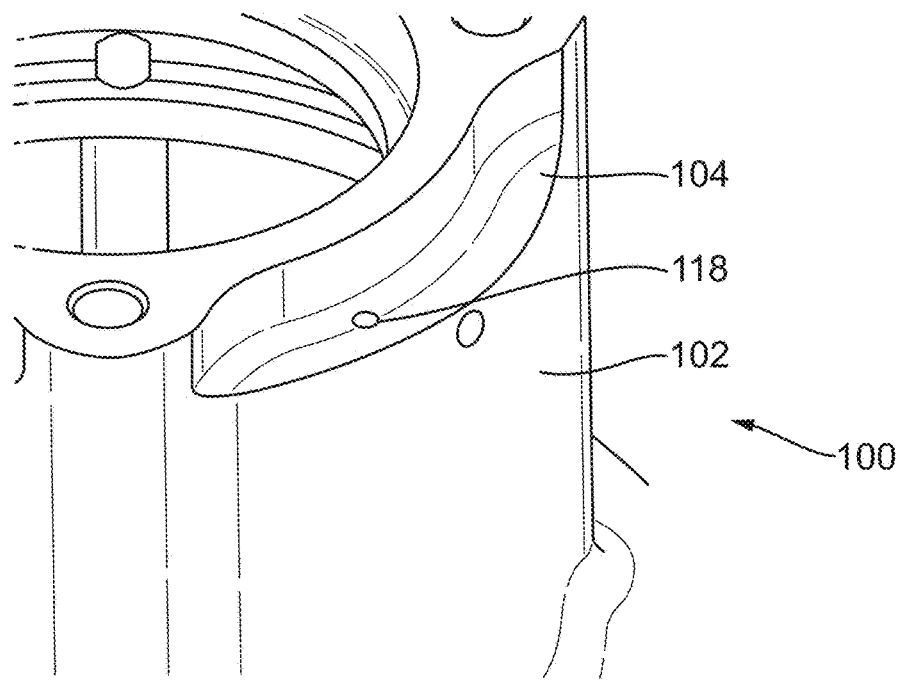
FIG. 6A shows the housing of a torque limiter according to the present disclosure.
Figure 6B:
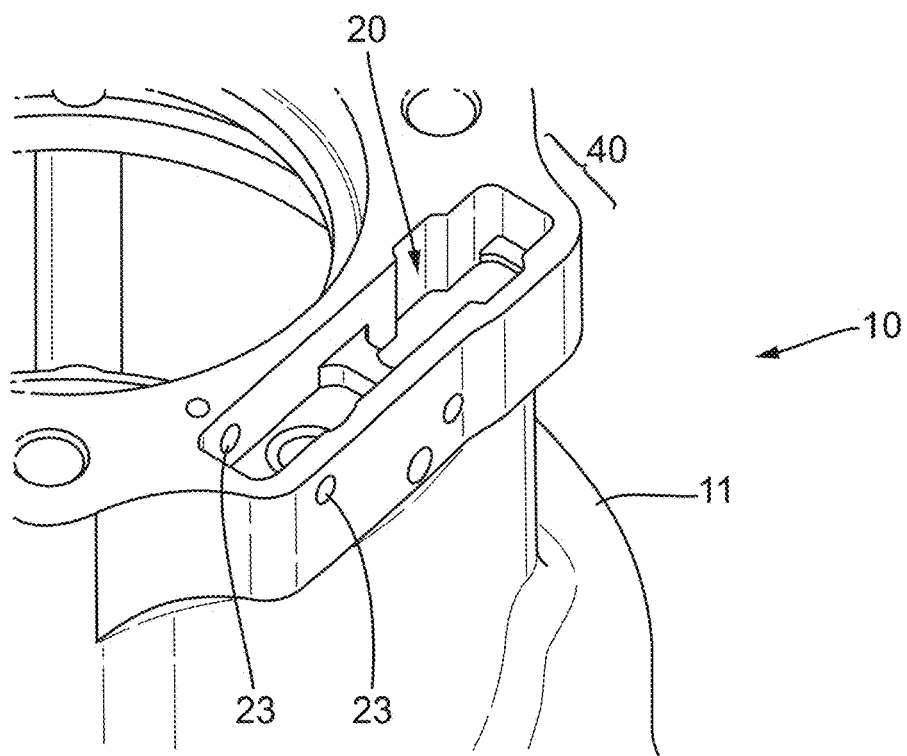
FIG. 6B shows the housing of the conventional torque limiter of FIG. 1.

FIGS. 6A and 6B show further benefits of the presently disclosed arrangement.

As can be seen in FIG. 6A, the housing 102 comprises outer surface 104. In order to accommodate the indicator of the present disclosure (i.e., the indicator 150), the housing 102 need only be provided with the cavity 118. This cavity 118 may be drilled into the housing 102 at any suitable location without any further modification or machining of the housing, or further portions.

Figure 1:
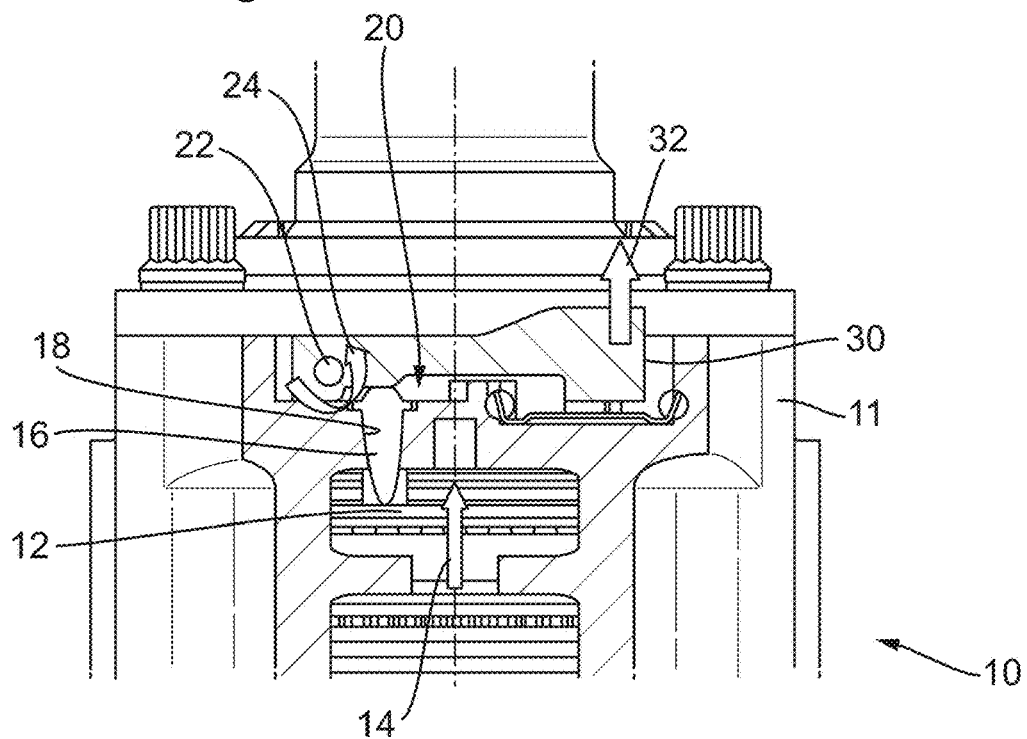
FIG. 1 shows a conventional apparatus.
Figure 2:
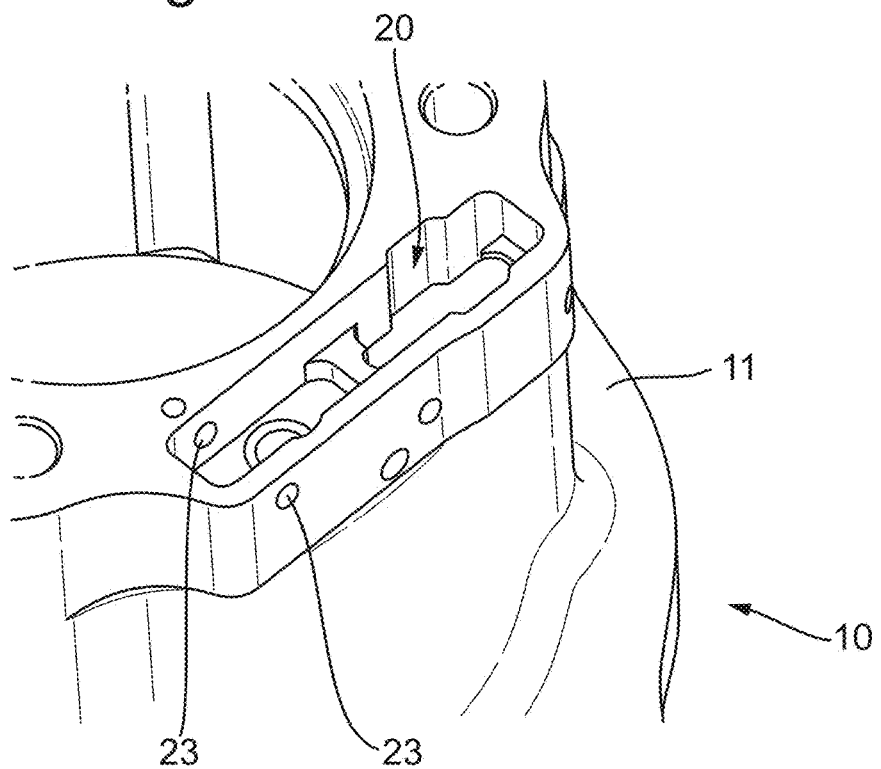
FIG. 2 is a close-up of the conventional apparatus of FIG. 1.

FIG. 6B shows the arrangement of the conventional torque limiter 10 as shown in FIG. 1, from which it can be seen the substantial amount of extra material and machining that is required to accommodate the indicator arm 30. For example, a large extension 40 of the housing 11 is required so that the cavity 20 can be provided. Furthermore, as discussed above various holes 23 are required to be drilled through this extension 40 to accommodate the further feature of the pivot 22.

The disclosed arrangement eliminates the need for all of this extra material and machining, and therefore provides benefits in terms of weight reduction, cost saving and labour or materials used in manufacturing.

The indicator in the examples described above is in the form of an elongated member or plug, although it will be appreciated that other shapes of member may be used and still provide the functional features of the technology described herein. For example, any shape of member could be movable within a similarly shaped cavity, whilst still incorporating resilient tines that expand upon tripping of the torque limiter as described above.

Although the present invention has been described with reference to preferred embodiments, it will be understood by those skilled in the art that various changes in form and detail may be made without departing from the scope of the invention as set forth in the accompanying claims.

The invention claimed is:

1. An indicator for a torque limiter, comprising:
   one or more resilient members configured to move from an initial, compressed state to a subsequent, expanded state to provide a visual indication that the torque limiter has tripped;
   wherein the one or more resilient members comprise one or more resilient tines connected at a first end to an outer surface of the indicator, such that the one or more resilient tines are compressible against or towards the outer surface of the indicator, and move from the compressed state to the expanded state in use by rotating about the connection at the first end.

2. An indicator as claimed in claim 1, wherein the subsequent, expanded state corresponds to a rest state of the one or more resilient members, and the initial, compressed state corresponds to a state in which an external force is applied in use to compress the one or more resilient members.

3. An indicator as claimed in claim 2, wherein upon release of the external force the one or more resilient members are configured to move from the initial, compressed state to the subsequent, expanded state to provide the visual indication that the torque limiter has tripped.

4. An indicator as claimed in claim 1, wherein the one or more resilient tines define an angle ($\alpha$) with respect to the outer surface of the indicator, wherein in the initial, compressed state the angle ($\alpha$) is relatively small, and in the subsequent, expanded state the angle ($\alpha$) is relatively large.

5. An indicator as claimed in claim 4, wherein the angle ($\alpha$) is between the outer surface of the indicator and a longitudinal axis (X) and/or surface of the one or more resilient tines.

6. An indicator as claimed in claim 5, wherein the surface of the one or more resilient tines corresponds to a surface of the resilient tines that is compressible towards the outer surface of the indicator.

7. An indicator as claimed in claim 1, wherein the one or more resilient members comprises:
   a first set of resilient members located at a first position on the indicator; and
   a second set of resilient members located at a second, different position on the indicator,
   wherein, in use, the first set of resilient members at the first position are configured to move from the initial, compressed state to the subsequent, expanded state prior to the second set of resilient members at the second, different position.

8. A torque limiter comprising:
   an indicator that includes one or more resilient members configured to move from an initial, compressed state to a subsequent, expanded state to provide a visual indication that the torque limiter has tripped;
   a cavity retaining the indicator, wherein cavity extends from an outer surface of the torque limiter to an internal chamber of the torque limiter, and is sized such that the one or more resilient members are compressed into their initial, compressed state when the indicator is located in the cavity in use; and
   a movable component configured to move in a given direction if the torque experienced by the torque limiter in use exceeds a given or predetermined amount;
   wherein the movable component is arranged to contact the indicator such that the movement of the movable component pushes the indicator at least partially through the cavity, and at least some of the resilient members completely through the cavity, such that the resilient members pushed completely through the cavity move from the initial, compressed state within the cavity to the subsequent, expanded state outside of the cavity and provide the visual indication that the torque limiter has tripped; and
   wherein:
   the indicator is elongated and comprises a longitudinal axis (Y);
   a first set of members are located at a first axial position along the length of the indicator;
   a second set of members are located at a second axial position along the length of the indicator, wherein the first axial position is closer to an end of the indicator that is located towards the outer surface of the torque limiter in use; and
   the movable component is configured to push the indicator a limited amount such that, when the movable component pushes the indicator the first set of members are pushed out of the cavity and move from the initial, compressed state to the subsequent, expanded state, and the second set of members remain within the cavity and press against the surface of the cavity to resist further movement of the indicator within the cavity.

9. A torque limiter as claimed in claim 8, further comprising:
  a rotational input drive member;
  a rotational output drive member co-axial with said input drive member;
  one or more coupling members through which torque is transmitted from the input drive member to the output drive member; and
  a braking device attached to said input drive member or said output drive member and configured to restrict or prevent rotational movement of the torque limiter if the torque applied by said input drive member exceeds a given or predetermined amount;
  wherein said braking device comprises the movable component.

\* \* \* \* \*